(12) United States Patent
Dang et al.

(10) Patent No.: US 11,187,879 B2
(45) Date of Patent: Nov. 30, 2021

(54) HIGH MAGNIFICATION MWIR CONTINUOUS ZOOM SYSTEM

(71) Applicant: VIETTEL GROUP, Ha Noi (VN)

(72) Inventors: Xuan Du Dang, Thai Nguyen Town (VN); Dai Cuong Que, Ha Noi (VN); Minh Anh Hoang, Ha Noi (VN); Van Tuan Vu, Ha Noi (VN); Thanh Dat Vu, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 180 days.

(21) Appl. No.: 16/668,966

(22) Filed: Oct. 30, 2019

(65) Prior Publication Data

US 2020/0201005 A1    Jun. 25, 2020

(30) Foreign Application Priority Data

Dec. 25, 2018 (VN) .............................. 1-2018-05912

(51) Int. Cl.
*G02B 15/14* (2006.01)
*G02B 15/20* (2006.01)
*G02B 13/14* (2006.01)

(52) U.S. Cl.
CPC ........... *G02B 15/146* (2019.08); *G02B 13/14* (2013.01); *G02B 15/20* (2013.01); *G02B 13/146* (2013.01); *G02B 15/1461* (2019.08); *G02B 15/1465* (2019.08)

(58) Field of Classification Search
CPC ...... G02B 15/146; G02B 15/20; G02B 13/11; G02B 15/1461; G02B 15/1462; G02B 16/146; G02B 13/008; G02B 15/1465
USPC .................................................. 359/357, 354
See application file for complete search history.

(56) References Cited

U.S. PATENT DOCUMENTS 7,092,150 B1 *   8/2006   Cox ....................... G02B 13/14
                                                           359/356

* cited by examiner

*Primary Examiner* — Kristina M Deherrera
(74) *Attorney, Agent, or Firm* — Patenttm.us

(57) ABSTRACT

A high magnification MWIR continuous zoom optical system is described herein that consists of the following components: a front detachable extender group, a fixed group for focusing incoming radiation, three moving groups for zooming and generating an intermediate image and a relay group. The mentioned optical system has the ability to work with MWIR radiation (3-5 μm) and generate a thermal image from the gathered radiation. The system also has the ability to zoom continuously in a wide variable focal length range with a high magnification ratio of 20×. With the use of a cooled detector, the combined system allows its user to be able to receive high quality thermal images in all FOV configurations.

18 Claims, 10 Drawing Sheets

HIGH MAGNIFICATION MWIR CONTINUOUS ZOOM SYSTEM

TECHNICAL FIELD

The present invention relates to an optical system which possesses a special structure as well as variable magnification for electro-optical applications. To be specific, this invention proposes an infrared optical system that can zoom continuously with high magnification ratio and the ability to receive mid-wave infrared signals (3-5 μm).

BACKGROUND

Previously, infrared optical systems that have limited field-of-view (FOV) configurations such as dual field-of-view or triple field-of-view are usually used in security and military products for surveillance, reconnaissance or target tracking applications. However, all of these systems share a common issue which is an interrupted output image while switching between different field-of-view configurations. Since it does take a while for the optical components to travel to their designated positions in the new configuration, the quality of the output image might not be good enough for observation during the configuration switching, which may lead to losing track of the targets that are being observed. In order to overcome this disadvantage, an infrared continuous zoom optical system was studied and designed so that the image quality is preserved during the focal length transition.

In recent years, Mid-wave infrared (MWIR) continuous zoom optical systems have been used popularly in advanced electro-optical surveillance products due to its long target detection and recognition range. Furthermore, this type of optical system is still able to maintain good image quality requirements in low visibility conditions such as fog, smoke, night-time, etc.

Nowadays, in order to fulfill the requirement to observe very far-away objects while still be able to cover a large field-of-view when necessary, a continuous zoom system with high magnification ratio was required to be developed. Besides, if the developed optical system is integrated on mobile platforms such as a gimbal in an unmanned aerial vehicle (UAV), its design will also need to be light and compact. The structure of the optical system will have to be cost-effective by using suitable materials. Those are the factors contributing to the difficulty in the design of the high magnification infrared continuous zoom optical system and most patents nowadays have not been able to fulfill all of the requirements mentioned above.

A high magnification MWIR continuous zoom system usually comes in pair with a cooled detector that works at a temperature as low as −190° C. The low operating temperature will allow for better sensitivity which helps when the optical system focuses into distant objects from more than 10 kilometers away. However, the cooled detector also comes with a problem, which is the Narcissus effect caused by high temperature difference between the system housing and the detector. This temperature difference is reflected at the optical surfaces within the system and turns back to the detector, causing abnormal background distribution on the output image and deviations from the original object radiation signal. The Narcissus effect is particularly serious in zoom lenses due to its changing nature while performing zoom and focus functions. Since this cannot be compensated wholly by digital methods, it is mandatory to eliminate this effect right from the design stage. Indeed, it is one of the hardest challenges to overcome in infrared continuous zoom optical systems using cooled detectors.

The design of an infrared continuous zoom optical system consists of many different tasks ranging from calculation of initial parameters to system optimization. It is a complicated and time-consuming process involving the use of trial-and-error method as well as the design experience of the optical engineer.

As said, this invention proposes a design of high magnification MWIR continuous zoom lens which solves all of the problems mentioned above. The designed system has a very high magnification ratio of up to 20× and it comes with a cooled detector so that a crisp target image is achieved in every FOV configurations.

SUMMARY

The purpose of the present invention is to propose a high magnification MWIR continuous zoom optical system. Among the components making up the optical system is the optical relay group, which keeps other elements' diameter from becoming too large during optimization. Together with the application of hybrid aspheric-diffractive surfaces, the optical quality of the system was maintained as the number of optical components was kept as small as possible. The extender part can be detached without any affect to the image quality of the remained part and may not be used in unnecessary circumstances. This ensured the lightness and compactness of the system as a whole. The intensity of the Narcissus effect was also kept to a minimum as the reflection properties of the optical surfaces were evaluated and optimized intensively.

The high magnification MWIR continuous zoom optical system consists of two parts with 6 main groups, therein:

The front part includes:

an extender group (G1) that comprises 3 optical elements in a negative-positive-negative (N-P-N) power configuration and that expands the diameter of the incoming light received from the object and increases the focal length variation range of the original system (without the extender group) by 1.4×;

The rear part includes:

a fixed group (G2) that comprises 2 optical elements; the first element is made from Silicon with positive power and two spherical surfaces, it also has its convex surface heading towards the object plane; the second element is made from Germanium with negative power, a spherical surface and an aspheric surface;

a moving group (G3) that comprises a Germanium element with negative power, a spherical surface and an aspheric surface, both of which are concave surfaces;

another moving group (G4) that comprises a Zinc Selenide element with two spherical surfaces, both of which are convex surfaces;

another moving group (G5) that comprises a Germanium element with positive power, a spherical surface and a hybrid aspheric-diffractive surface;

a relay group (G6) that comprises 3 optical elements in a positive-negative-positive (P-N-P) power configuration, it was optimized to be able to move in a small range of ±0.5 mm in order to focus the incoming light from close objects and maintain the system image quality at different environment conditions;

Furthermore, according to the present invention, the three elements of the extender group (G1) also include these following properties:

the first front element is made from Germanium with negative power, a convex spherical surface and a concave aspheric surface, with the convex surface heading towards the object plane;

the second following element is made from Silicon with positive power and two spherical surfaces;

the third following element is made from Silicon with negative power and two spherical surfaces;

Furthermore, according to the present invention, the front extender part can be detached while the rear part still operates independently with close to diffraction limit of modulation transfer function (MTF).

Furthermore, according to the present invention, the diameter of the first element in the fixed group (G2) is equivalent to the entrance pupil diameter at narrow field-of-view (NFOV) configuration of the system when the extender is detached.

Furthermore, according to the present invention, the simultaneous change in the positions of (G3), (G4) and (G5) leads to the change in system focal length within the following range:

the minimum system focal length is 21 mm with a 38.34° FOV and is achieved when (G3) and (G4) are at the most distant positions from each other whilst (G5) is at the closest position to (G4);

the maximum system focal length is 420 mm with a 1.67° FOV and is achieved when (G3) and (G4) are at the closest positions to each other whilst (G5) is at the most distant position from (G4);

Furthermore, according to the present invention, the three elements of the relay group (G6) also include these following properties:

the first front element is made from Germanium with positive power, a convex aspheric surface and a concave spherical surface;

the second following element is made from Germanium with negative power, an aspheric surface and a hybrid aspheric-diffractive surface;

the third following element is made from Silicon with positive power, a concave spherical surface and a convex spherical surface, with the convex surface heading towards image plane;

Furthermore, according to the present invention, the sag values of no n-spherical surfaces in the optical system are defined by the following equation:

$$z = \frac{\frac{1}{R}y^2}{1+\sqrt{1-(1+k)\frac{1}{R^2}y^2}} + \sum_{i=2}^{n} A_{2i}y^{2i}$$

where:
R—Surface radius of curvature;
y—Aperture height, measured perpendicular to optical axis;
k—Conic coefficient;
A—Even aspheric coefficients ($A_4$, $A_6$, $A_8$, $A_{10}$, etc.);

Meanwhile, the phase of the diffractive surfaces can be defined by the following equation:

$$\Phi = M \sum_{i=1}^{n} A_i \rho^{2i}$$

where:
A—Diffractive coefficients ($A_1$, $A_2$, etc.);
ρ—Normalized radial coordinate;
Φ—Added phase at coordinate ρ;

According to the proposed structure, the optical system is optimized in order to focus MWIR radiation coming from objects lying within the field-of-view of the optical system onto the detector surface and generate a high quality thermal image of those objects.

According to the proposed structure, the optical system is optimized in order to perform the continuous zoom action smoothly with high magnification ratio (20λ) and with the image quality remains sharp at all time during zooming.

According to the proposed structure, the extender group in the optical system is responsible for expanding the entrance pupil diameter, which leads to a wider variable focal length range.

According to the proposed structure, the fixed group which lies right behind the extender group is optimized for focusing the incoming radiation. Next up are three movable elements which are responsible for changing the focal length of the system and generating an intermediate image plane. Their power configuration is negative-positive-positive (N-P-P).

According to the proposed structure, the relay group is created in order to magnify the generated intermediate image into a real image on the final detector image plane. The relay group is also tuned so that it can move within a small range of ±0.5 mm. This allows the optical system to have the ability to work in a wide range of temperature (−20° C.~60° C.) and to have a minimum focus range of 10 m at wide field-of-view (WFOV) configuration and 100 m at NFOV configuration.

In general, this invention of a high magnification MWIR continuous zoom optical system is optimized so that the diameter of the first front element in the fixed group is equivalent to the entrance pupil diameter of the optical system at NFOV configuration. The materials that are used in the system are also common infrared materials including Germanium, Zinc Selenide and Silicon. Surfaces that require complex fabrication technologies are only applied on easy-to-process materials including Germanium and Zinc Selenide. All of the mentioned constraints are followed strictly during the design of the optical system, so that the resulting system is cost-effective as a whole.

In general, this invention of a high magnification MWIR continuous zoom optical system must also satisfy the following conditions:

$$\begin{cases} 50 \le f_1 \le 120 \\ -60 \le f_2 \le -10 \\ 15 \le f_3 \le 60 \\ 100 \le f_4 \le 300 \end{cases}$$

where:
$f_1$ (mm) is the focal length of the fixed group (G2);
$f_2$ (mm) is the focal length of the first moving group (G3);
$f_3$ (mm) is the focal length of the second moving group (G4);
$f_4$ (mm) is the focal length of the third moving group (G5);

DETAILED DESCRIPTION

Figure 1:
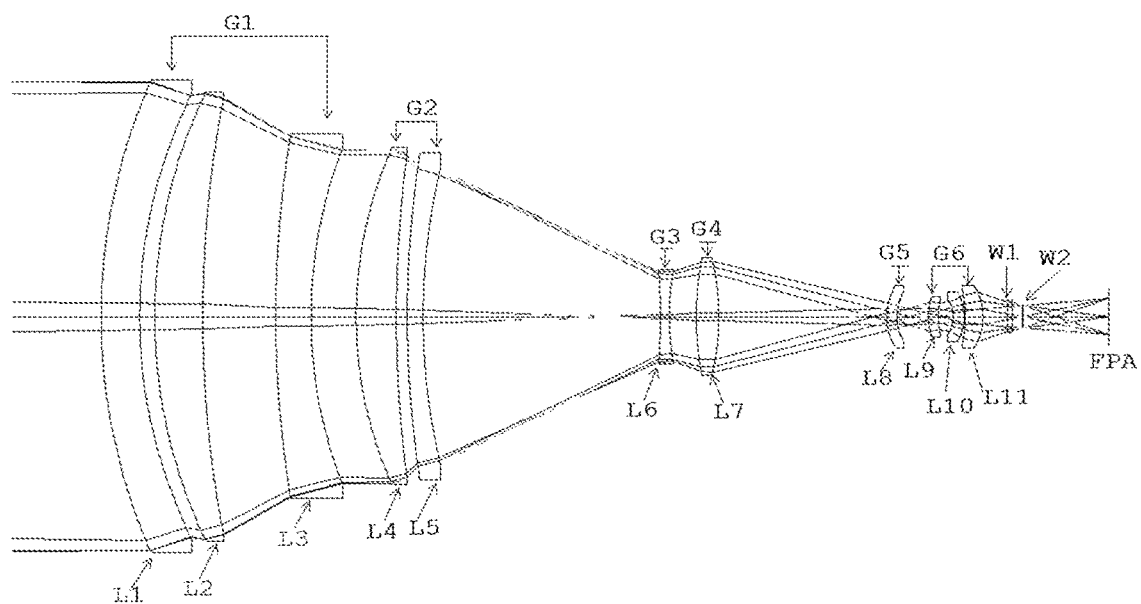
FIG. 1 illustrates the general structure of the optical system of the present invention.
Figure 2:
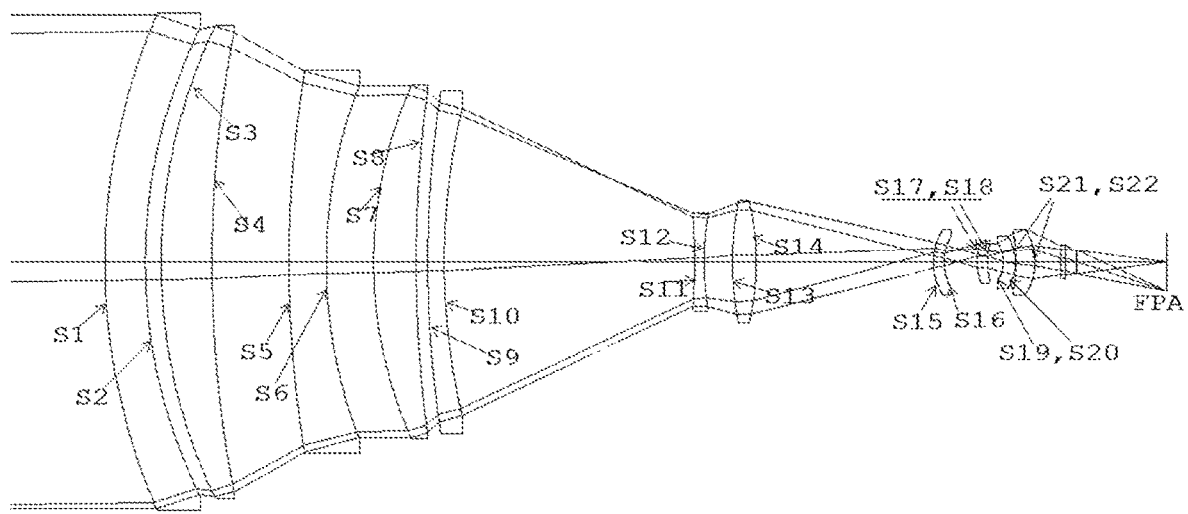
FIG. 2 illustrates the structure of the optical system at NFOV configuration.

Referring to FIG. 1, the high magnification MWIR continuous zoom optical system consists of two parts with 6 main groups which follow this particular arrangement from the object plane to the final image plane:

the extender group (G1), also the closest group to the object plane;
the fixed group (G2);
the first moving group (G3);
the second moving group (G4);
the third moving group (G5);
the fourth moving group, or the relay group (G6), which stands right in front of the image plane (FPA);

Referring to FIG. 1 and FIG. 2, the extender group (G1) comprises three optical elements, with the first front element (L1) made from Germanium, having negative power, a convex spherical surface (S1) heading towards the object plane and a concave spherical surface (S2). The following second element (L2) is made from Silicon, has positive power and two spherical surfaces, which are (S3) and (S4). The following third element (L3) is made from Silicon, has negative power and also two spherical surfaces, which are (S5) and (S6). Overall, the extender group has an N-P-N power configuration and is responsible for the expansion of the diameter of the incoming radiation and also the expansion of the variable focal length range of the optical system. To be specific, according to the proposed structure, the extender group might be able to expand the diameter of the incoming radiation from 1.4× up to 2.5× of the original system (without the extender group), which translates to the variable focal length range to be expanded from at least 21-420 mm up to 37.5-750 mm.

Referring to FIG. 1 and FIG. 2, the fixed group (G2) comprises two optical elements. The first front element (L4) is made from Silicon, has positive power and two spherical surfaces, which are (S7) and (S8), with the convex surface (S7) heading towards the object plane. The second following element (L5) is made from Germanium, has negative power, a spherical surface (S9) and an aspheric surface (S10).

The diameter value of the first front element (L4) in the fixed group (G2) is equivalent to the entrance pupil diameter of the optical system at NFOV configuration.

Referring to FIG. 1 and FIG. 2, (G3), (G4) and (G5) are moving zoom groups that can move simultaneously within the optical system parameter in order to change the focal length of the system and generate an intermediate image plane. Group (G3) comprises one single Germanium element (L6) that has negative power, a concave aspheric surface (S11) and a concave spherical surface (S12). Group (G4) comprises one single Zinc Selenide element (L7) that has two convex aspheric surfaces, which are (S13) and (S14). Group (G5) comprises one single Germanium element (L8) that has positive power, an aspheric surface (S15) and a hybrid aspheric-diffractive surface (S16) for optimization of optical aberrations of the optical system, especially chromatic aberration.

Referring to FIG. 1 and FIG. 2, a fourth moving group or relay group (G6) comprises three optical elements with a P-N-P power configuration. The first positive front element (L9) is made from Germanium, has a convex aspheric surface (S17) and a concave spherical surface (S18). The second negative following element (L10) is also made from Germanium, has an aspheric surface (S19) and a hybrid aspheric-diffractive surface (S20). The third positive following element (L11) is made from Silicon, has a concave surface (S21) and a convex surface (S22) which heads towards the final image plane. According to the proposed structure, group (G6) is designed so that it can move within a small range of ±0.5 mm for the ability to work in a wide range of temperature (−20° C.~60° C.) and having a minimum focus range of 10 m at WFOV configuration and 100 m at NFOV configuration.

Figure 3:
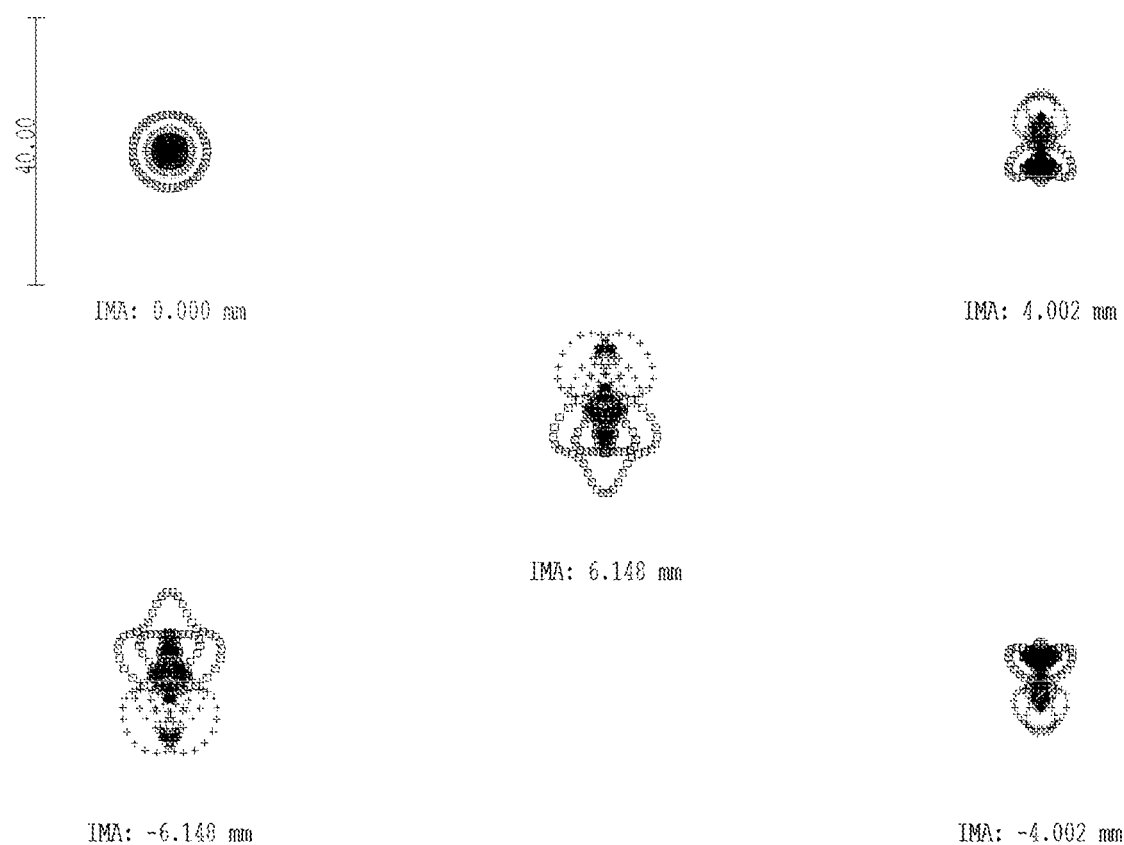
FIG. 3 illustrates the spot diagram on the detector image plane at NFOV configuration.
Figure 4:
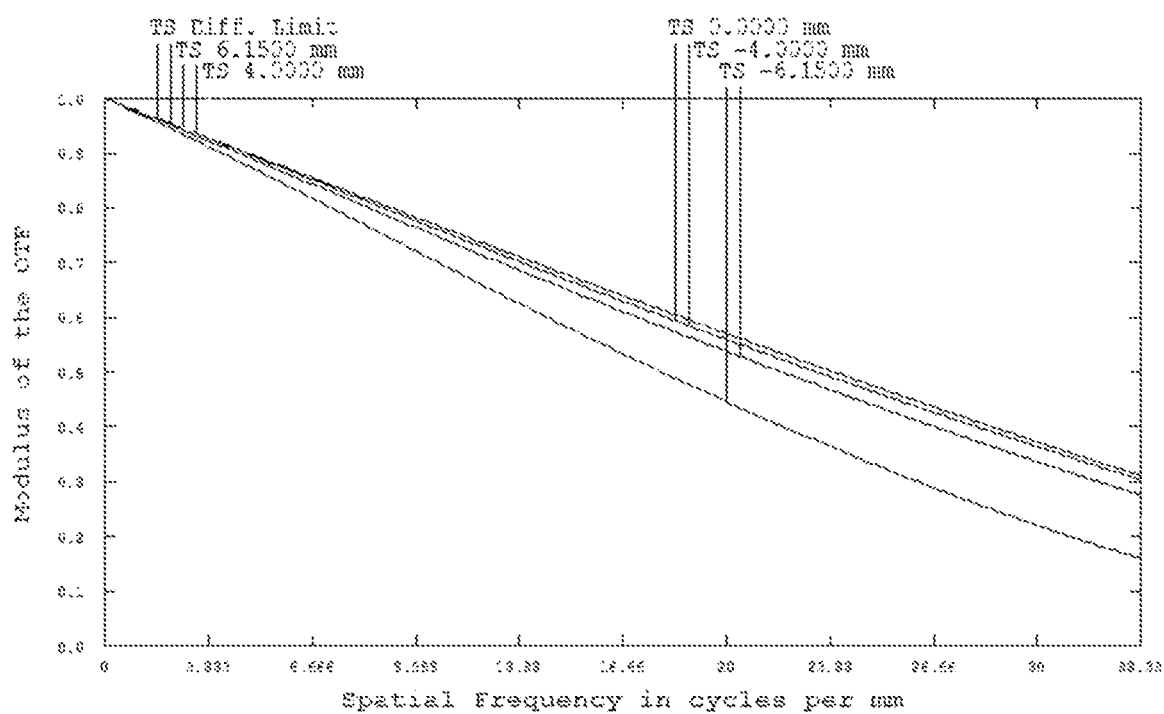
FIG. 4 illustrates the MTF diagram of the optical system at NFOV configuration.
Figure 6:
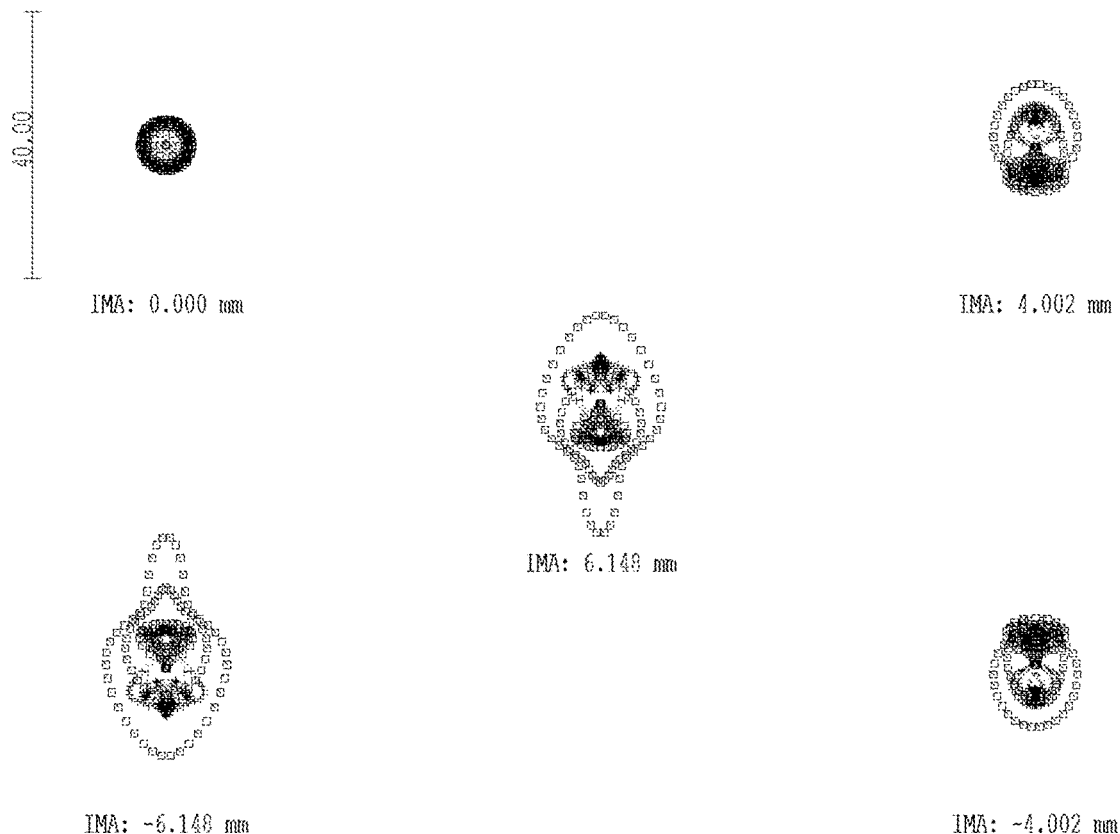
FIG. 6 illustrates the spot diagram on the detector image plane at MFOV configuration.

According to the proposed structure and referring to FIG. 3, FIG. 4, FIG. 6 and

Figure 7:
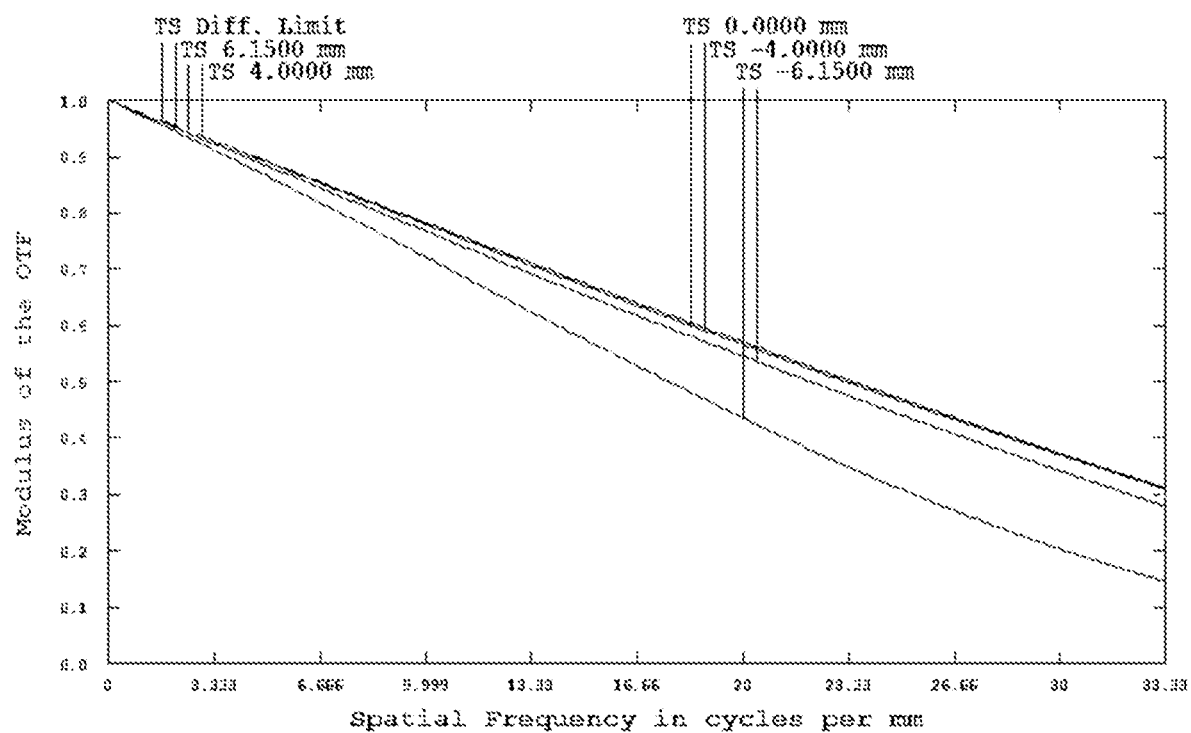
FIG. 7 illustrates the MTF diagram of the optical system at MFOV configuration.
Figure 9:
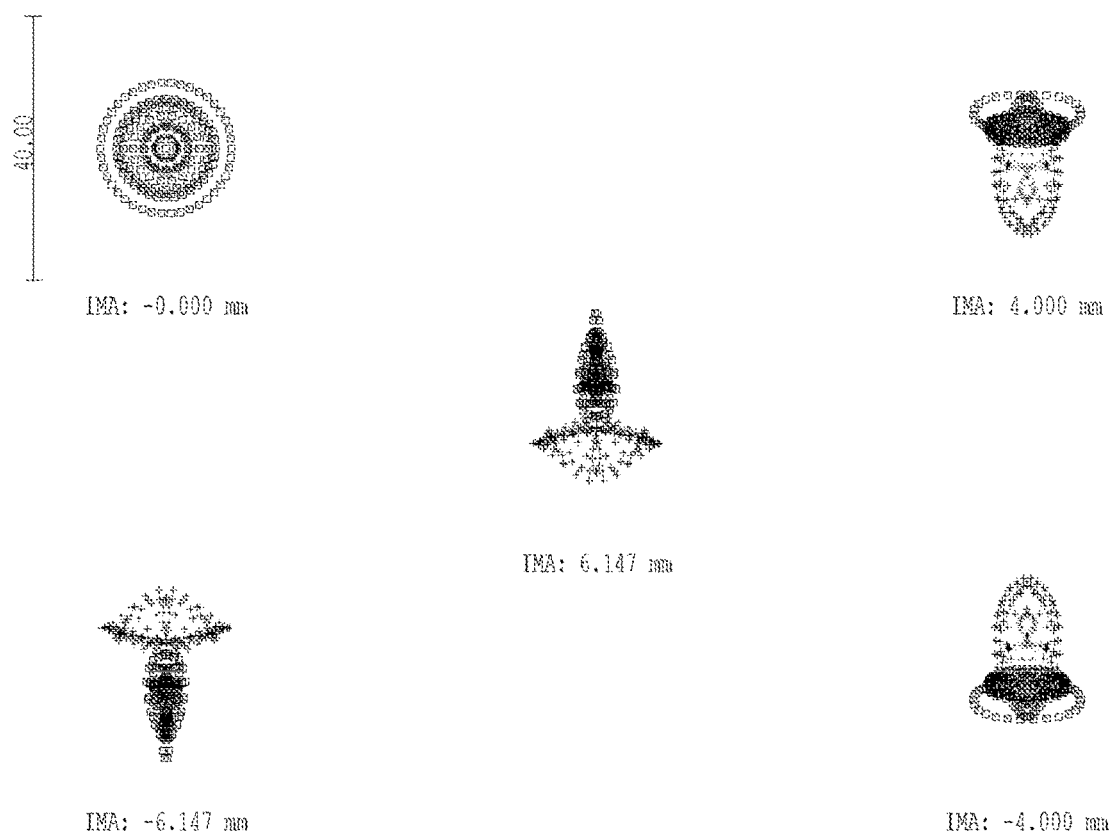
FIG. 9 illustrates the spot diagram on the detector image plane at WFOV configuration.
Figure 10:
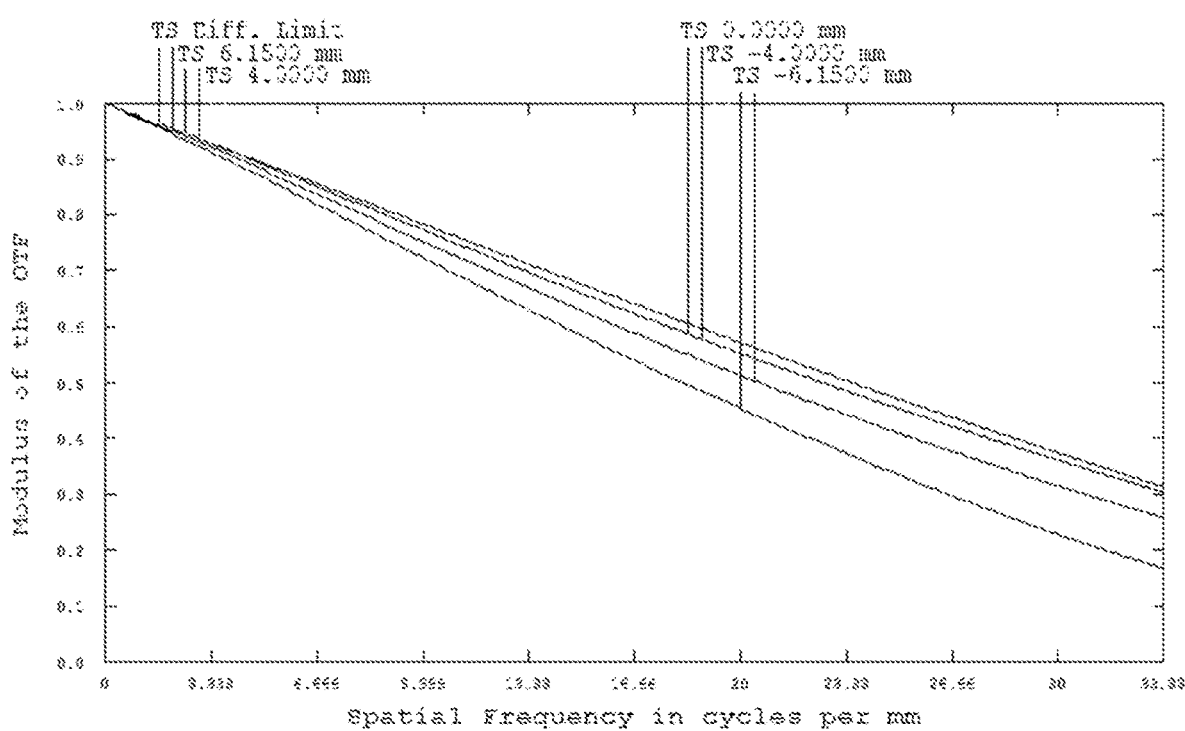
FIG. 10 illustrates the MTF diagram of the optical system at WFOV configuration.

FIG. 7, FIG. 9, FIG. 10, the optical system is optimized in order to gather MWIR radiation (3-5 μm) coming from objects that lie within the FOV of the system and focus the radiation onto the detector image plane, which gives crisp images of the mentioned objects.

According to the proposed structure, the optical system is optimized so that it can have the ability to zoom continuously within a magnification ratio of 20× while maintaining the high quality of the final image in every configurations.

Figure 5:
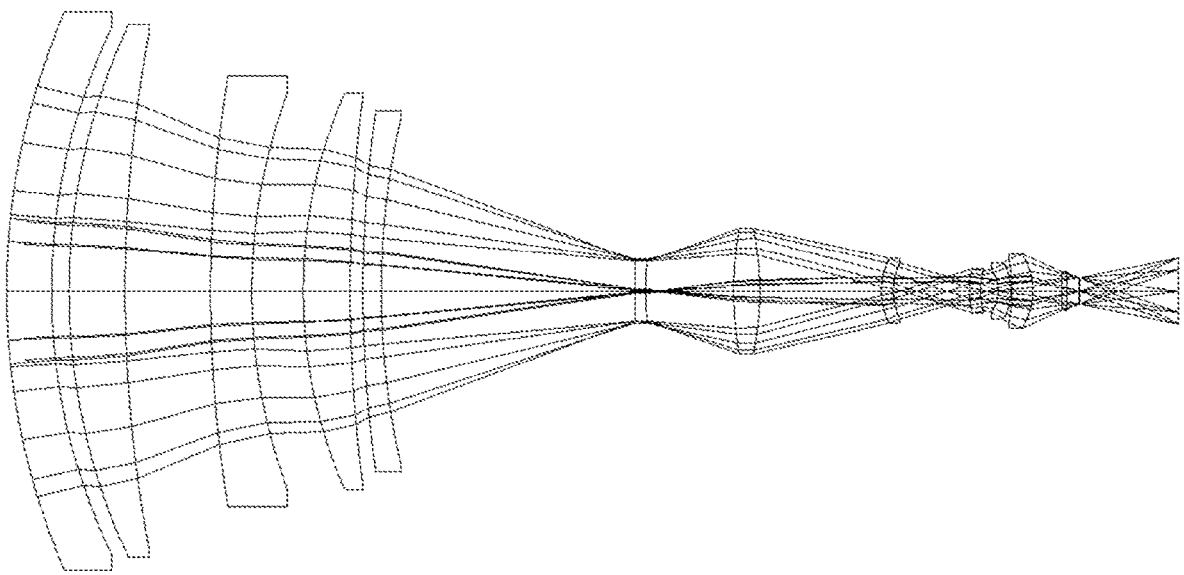
FIG. 5 illustrates the structure of the optical system at MFOV configuration.
Figure 8:
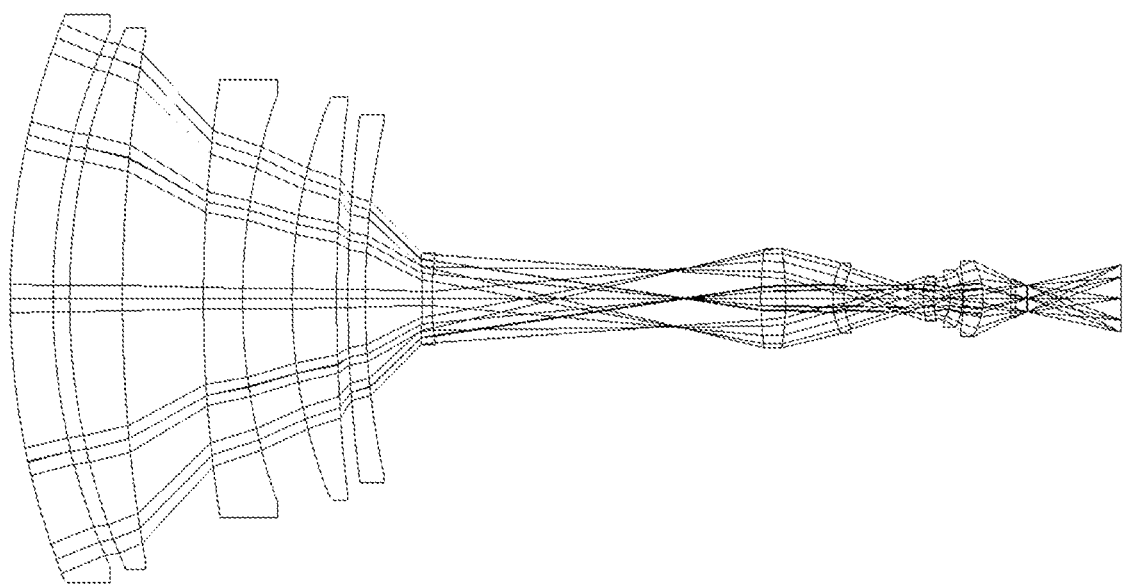
FIG. 8 illustrates the structure of the optical system at WFOV configuration.

Referring to FIG. 2, FIG. 5 and FIG. 8, the simultaneous change in positions of (G3), (G4) and (G5) groups along the optical axis leads to the change in the focal length of the optical system. For example, when the extender group is added to the optical system making the focal length range expand by 1.4× while (G3) and (G4) are at the most distant positions from each other and (G5) is at the closest position to (G4), the optical system is at its smallest focal length value, which is 21 mm and corresponds to a wide FOV of 38.34°. In return, when (G3) and (G4) are at the closest positions to each other and (G5) is at the most distant position from (G4), the optical system is at its largest focal length value, which is 420 mm and corresponds to a narrow FOV of 1.67°.

Figure 11:
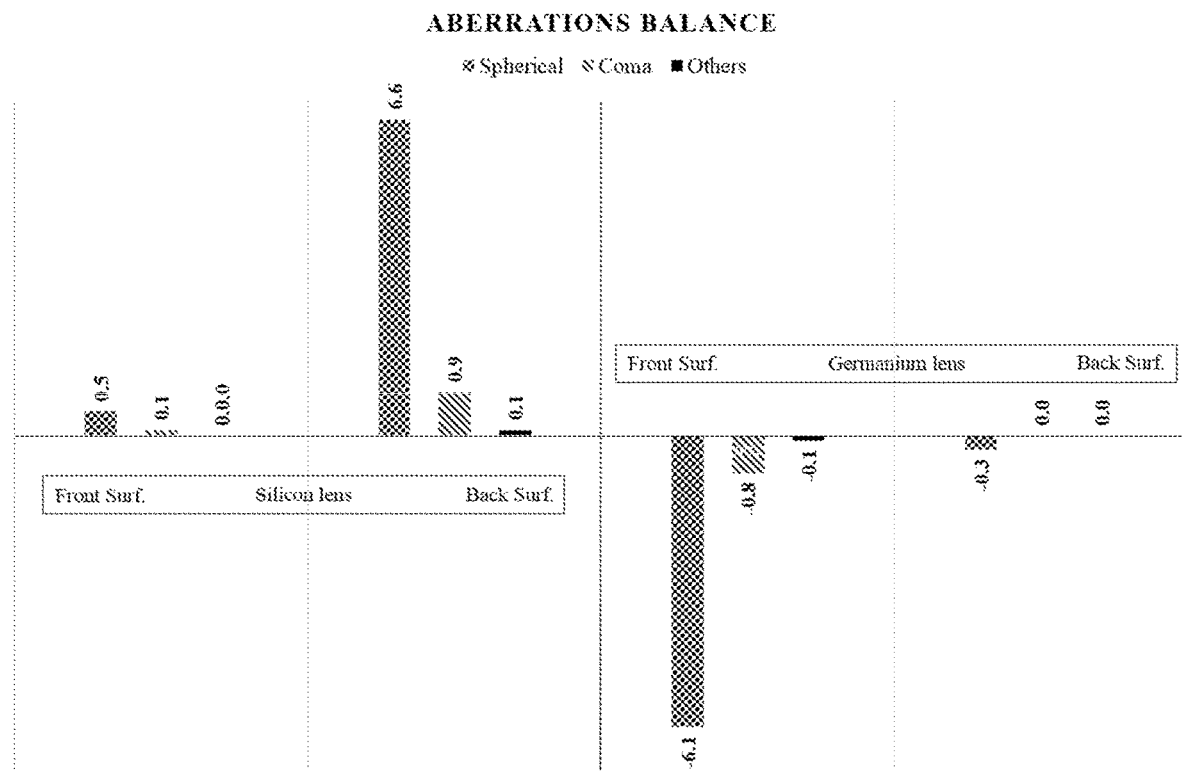
FIG. 11 illustrates the Seidel diagram which shows the distribution of optical aberrations at each optical surface of lenses in the fix group (G2).
Figure 12:
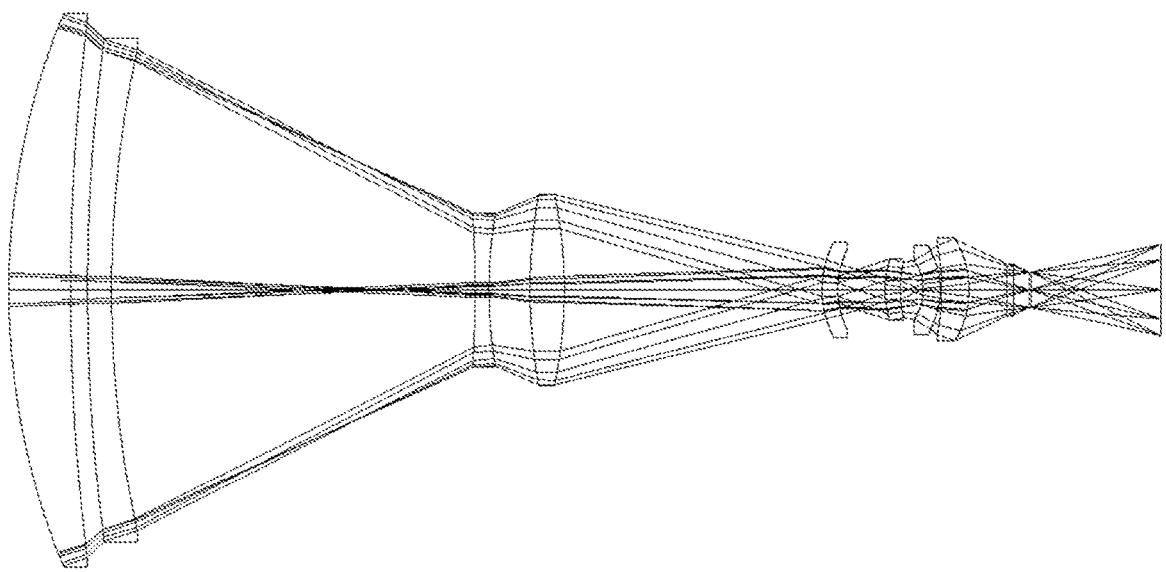
FIG. 12 illustrates the structure of the optical system at NFOV configuration when the extender is detached.
Figure 13:
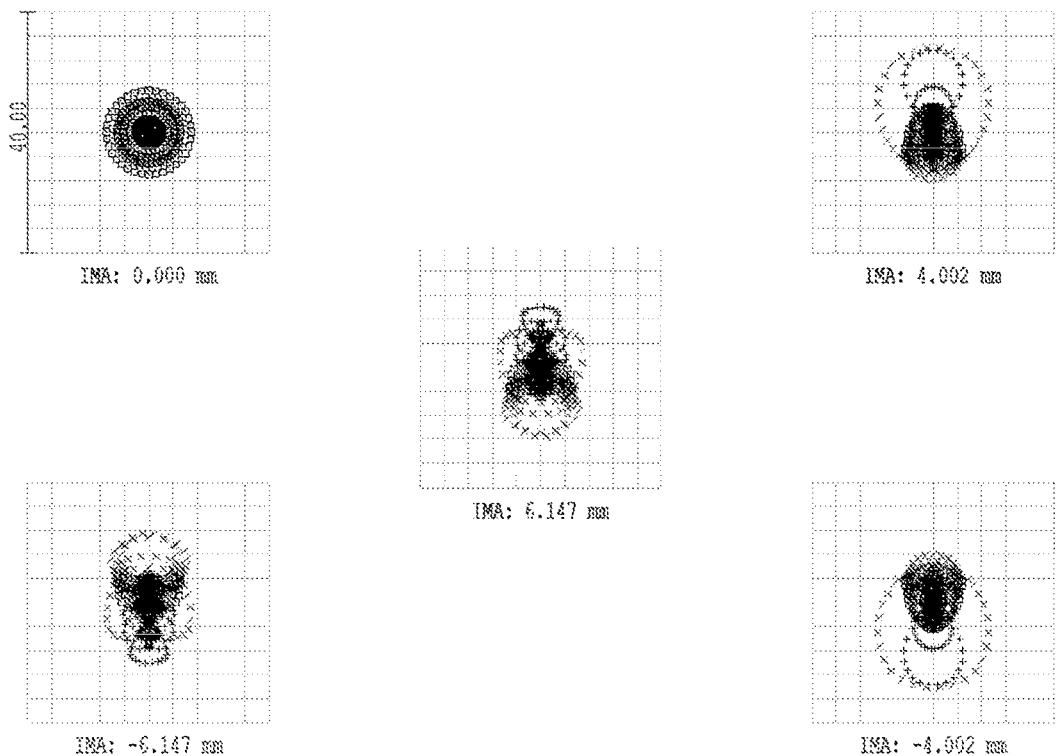
FIG. 13 illustrates the spot diagram on the detector image plane at NFOV configuration when the extender is detached.
Figure 14:
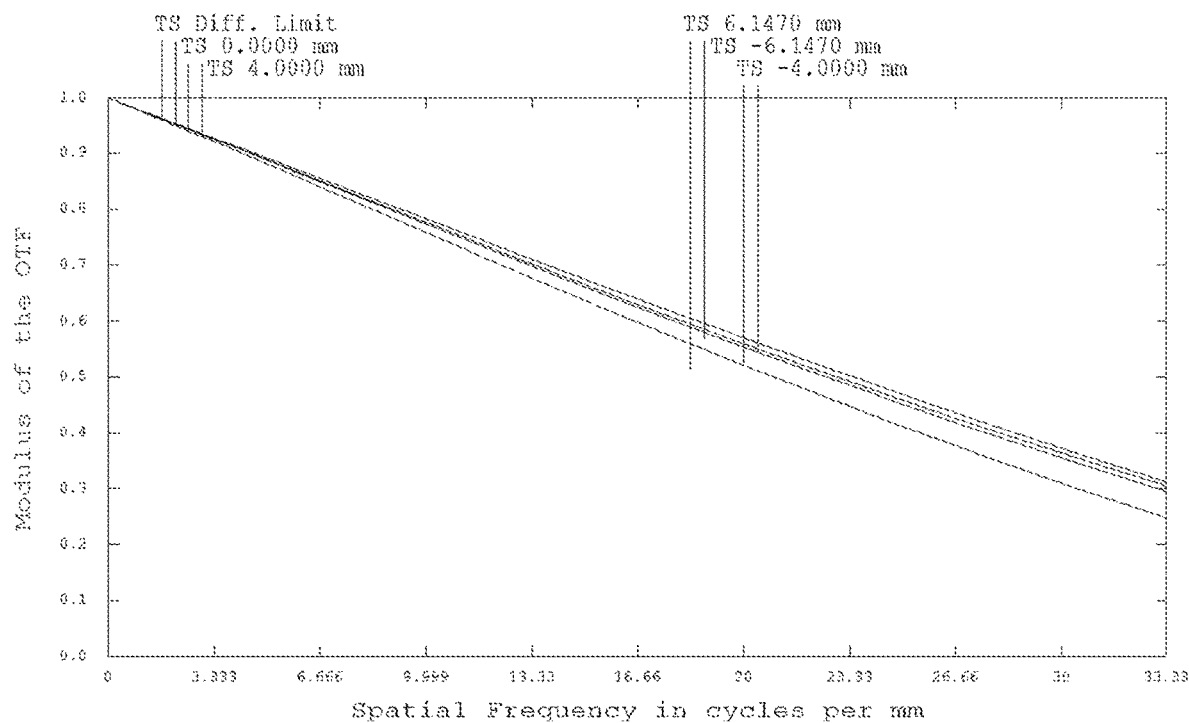
FIG. 14 illustrates the MTF diagram of the optical system at NFOV configuration when the extender is detached.
Figure 15:
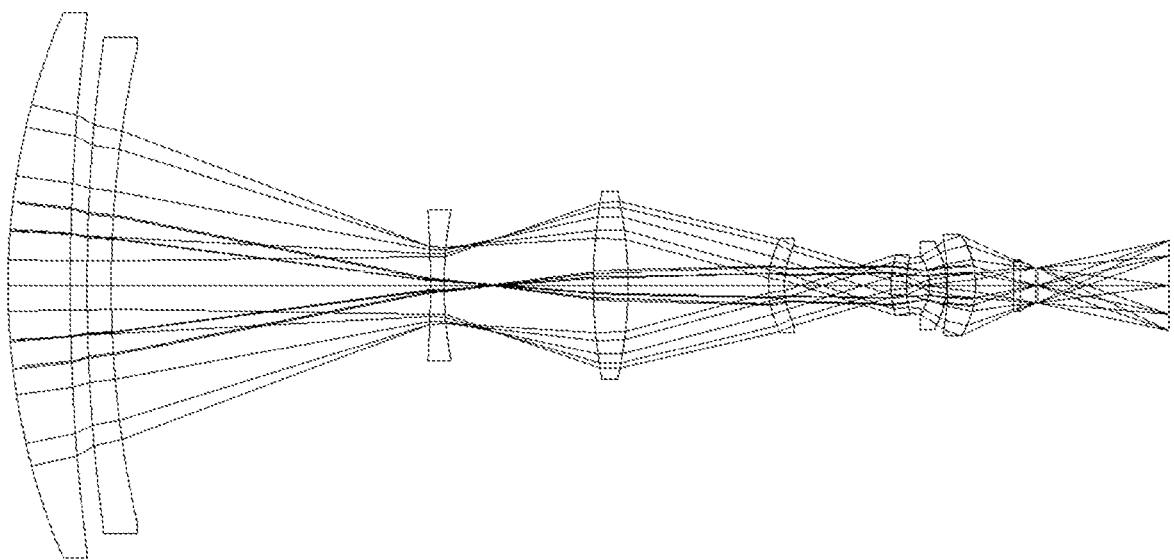
FIG. 15 illustrates the structure of the optical system at MFOV configuration when the extender is detached.
Figure 16:
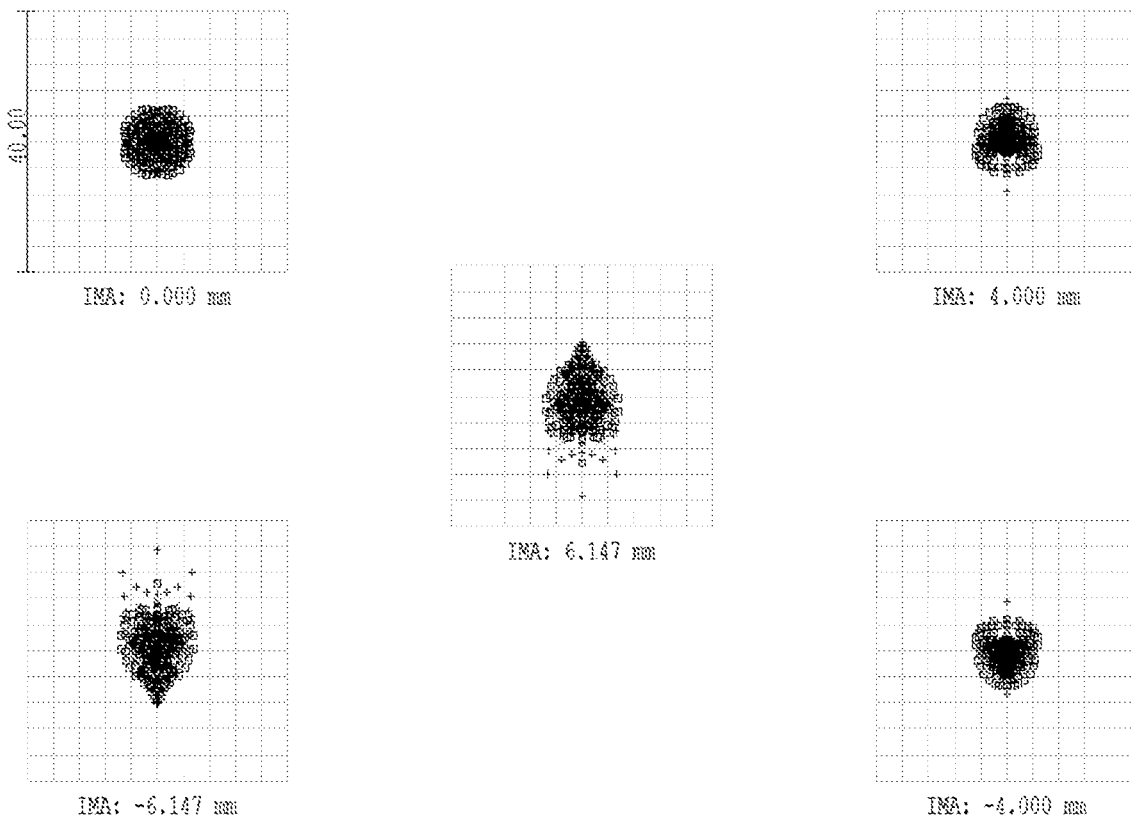
FIG. 16 illustrates the spot diagram on the detector image plane at MFOV configuration when the extender is detached.
Figure 17:
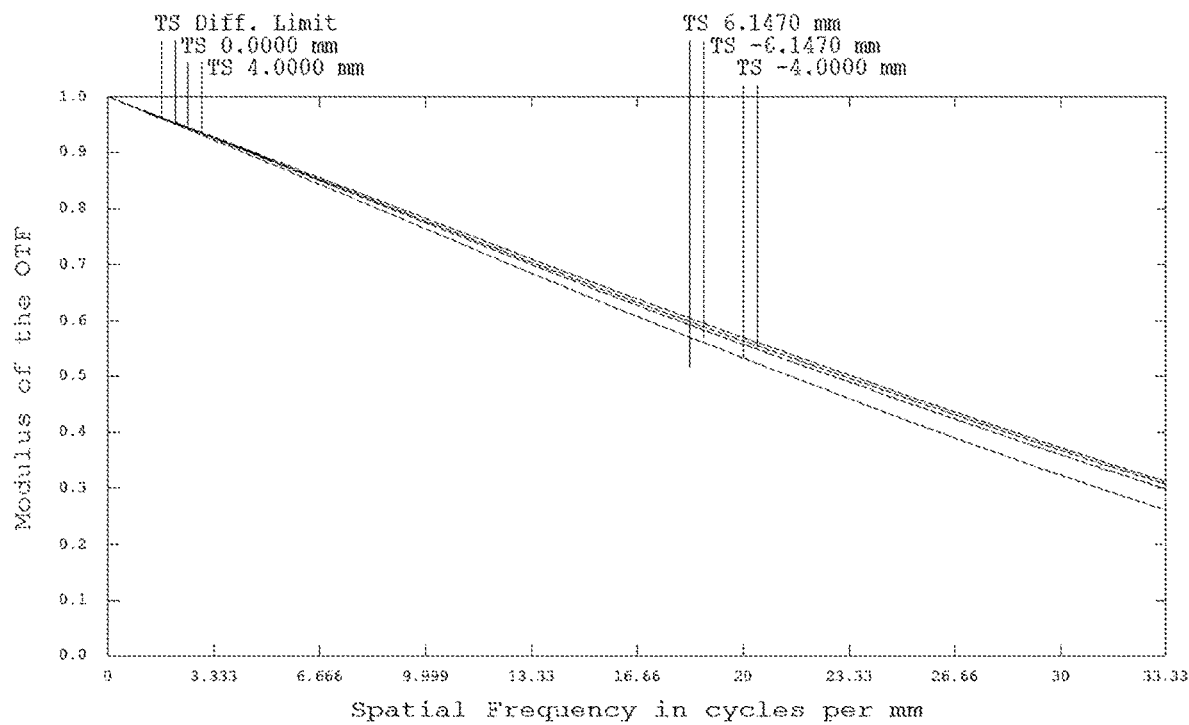
FIG. 17 illustrates the MTF diagram of the optical system at MFOV configuration when the extender is detached.
Figure 18:
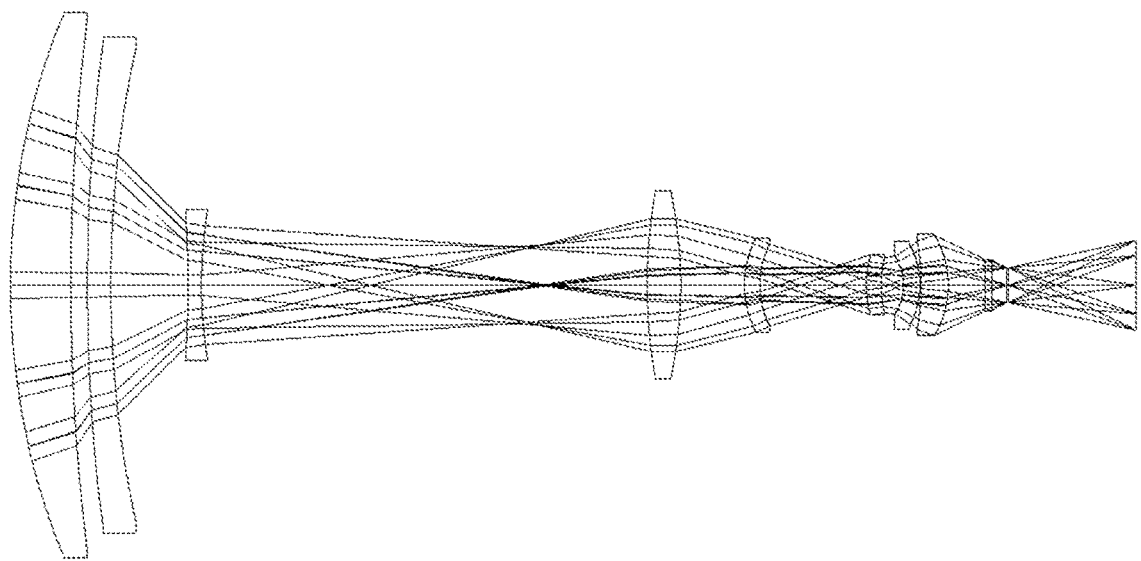
FIG. 18 illustrates the structure of the optical system at WFOV configuration when the extender is detached.
Figure 19:
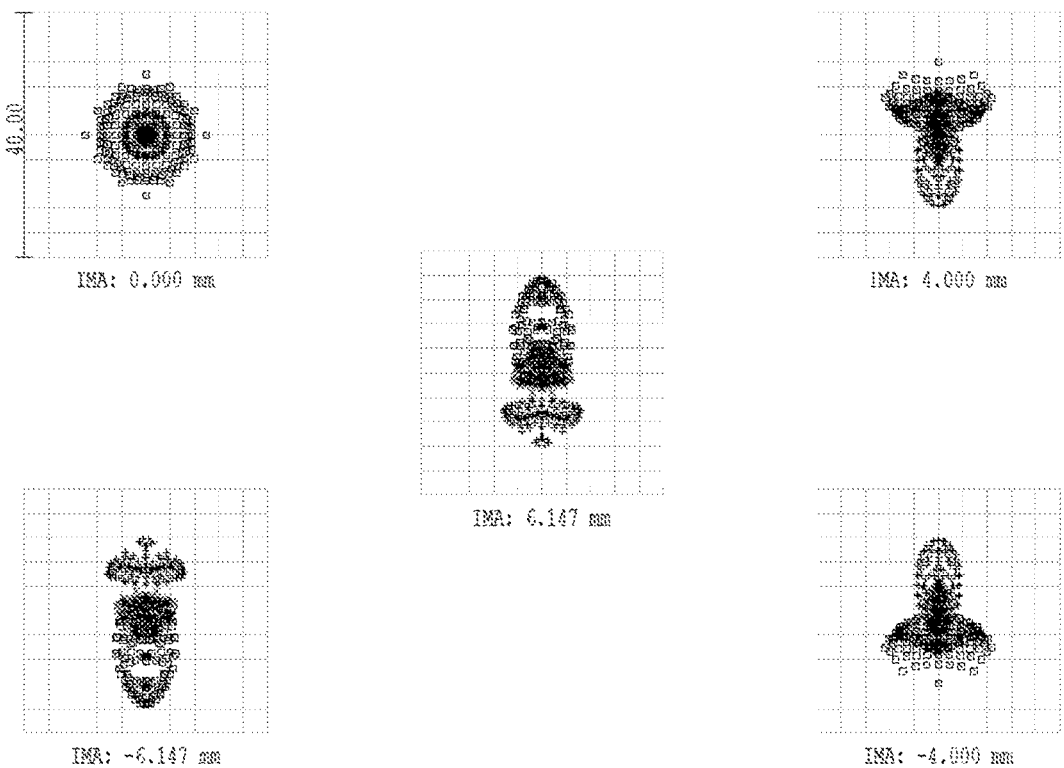
FIG. 19 illustrates the spot diagram on the detector image plane at WFOV configuration when the extender is detached.
Figure 20:
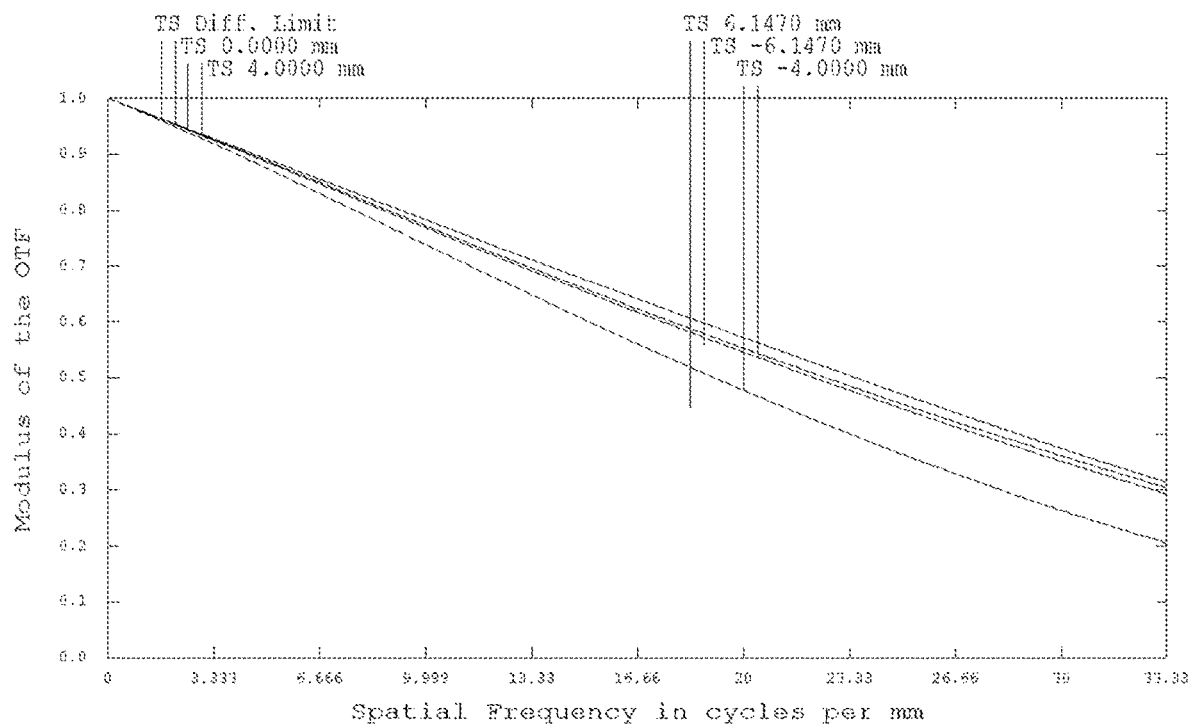
FIG. 20 illustrates the MTF diagram of the optical system at WFOV configuration when the extender is detached.

Referring to FIG. 11, the material combination between a positive Silicon element (L4) and a negative Germanium element (L5), together with an aspheric surface (S10) allow the fixed group (G2) to effectively balance a number of optical aberrations including spherical aberration, coma, and astigmatism.

Referring to figures from FIG. 12 to FIG. 20, when the extender is detached, the remaining part of the system still maintains good optical quality and operates as an independent high magnification middle wave infrared continuous zoom lens.

The invention of a high magnification MWIR continuous zoom optical system is designed in a way that must satisfy these conditions from its original system (without the extender group):

$$\begin{cases} 50 \le f_1 \le 120 \\ -60 \le f_2 \le -10 \\ 15 \le f_3 \le 60 \\ 100 \le f_4 \le 300 \end{cases}$$

where:
$f_1$ (mm) is the focal length of the fixed group (G2);
$f_2$ (mm) is the focal length of the first moving group (G3);
$f_3$ (mm) is the focal length of the second moving group (G4);
$f_4$ (mm) is the focal length of the third moving group (G5);

Furthermore, according to the present invention, the sag values of every non-spherical surfaces in the optical system are defined by the following equation:

$$z = \frac{\frac{1}{R}y^2}{1+\sqrt{1-(1+k)\frac{1}{R^2}y^2}} + \sum_{i=2}^{n} A_{2i} y^{2i}$$

where:
R—Surface radius of curvature;
y—Aperture height, measured perpendicular to optical axis;
k—Conic coefficient;
A—Even aspheric coefficients ($A_4$, $A_6$, $A_8$, $A_{10}$, etc.);

Table 1 below presents the aspheric data of non-spherical surfaces included in the proposed optical system with the X, Y and Z values must stay within the following ranges:

$$\begin{cases} 3 \times 10^{-7} \le X \le 3 \times 10^{-5} \\ 5 \times 10^{-12} \le Y \le 5 \times 10^{-11} \\ -1 \times 10^{-5} \le Z \le -1 \times 10^{-7} \end{cases}$$

TABLE 1

| Surface | Conic (k) | $A_4$ | $A_6$ | $A_8$ | $A_{10}$ |
|---|---|---|---|---|---|
| 2 | 0.11 | −8.19E−09 | −5.88E−13 | −9.52E−17 | 0.00E+00 |
| 10 | 0 | 3.38E−08 | 2.95E−12 | 2.03E−15 | 0.00E+00 |
| 11 | 0 | X | −6.57E−09 | 5.50E−11 | −1.65E−13 |
| 13 | 0 | −3.26E−06 | −6.10E−09 | Y | 6.96E−14 |
| 14 | 0 | 2.57E−06 | −9.03E−09 | 1.24E−11 | 6.29E−14 |
| 15 | 0 | −1.29E−05 | −6.19E−07 | 0.00E+00 | 0.00E+00 |
| 16 | 0 | −2.06E−05 | Z | 2.31E−09 | 3.12E−11 |
| 17 | 0 | −6.84E−05 | 3.03E−06 | −1.75E−07 | 2.64E−09 |
| 19 | 0 | −8.96E−04 | −4.51E−06 | 2.44E−07 | 1.95E−08 |
| 20 | 0 |  | 2.79E−06 | 6.38E−08 | 4.69E−10 |

Meanwhile, the diffractive surfaces used in the optical system are defined by the following equation:

$$\Phi = M \sum_{i=1}^{n} A_i \rho^{2i}$$

where:
A—Diffractive coefficients ($A_1$, $A_2$, etc.);
ρ—Normalized radial coordinate;
Φ—Added phase at coordinate ρ;
Table 2 presents diffractive data (in phase) of all diffractive surfaces used in the proposed optical system.

TABLE 2

| Surface | $A_1$ | $A_2$ |
|---|---|---|
| 16 | −55.075 | 4.74 |
| 20 | −40.12 | 4.064 |

According to the present invention, the following Table 3 will present the prescription data (in millimeters) and materials that could be used to manufacture a high magnification MWIR continuous zoom optical system. The example is illustrative only and does not impose any limitations on the scope of the present invention. For a MWIR continuous zoom optical system with a focal length range of 21-420 mm and an aperture of F/#4.0, the specific parameters of every elements in the optical system could be as follow:

TABLE 3

| Surface | Surface type | Radius of curvature | Thickness | Material |
|---|---|---|---|---|
| 1 | Spherical | 130.04 | 8.60 | GERMANIUM |
| 2 | Aspheric | 112.43 | 3.37 |  |
| 3 | Spherical | 116.22 | 10.70 | SILICON |
| 4 | Spherical | 257.47 | 16.38 |  |

TABLE 3-continued

| Surface | Surface type | Radius of curvature | Thickness | Material |
|---|---|---|---|---|
| 5 | Spherical | 247.24 | 7.90 | SILICON |
| 6 | Spherical | 104.58 | 10.00 | |
| 7 | Spherical | 92.22 | 9.00 | SILICON |
| 8 | Spherical | 277.75 | 2.45 | |
| 9 | Spherical | 238.67 | 3.50 | GERMANIUM |
| 10 | Aspheric | 145.83 | V1 | |
| 11 | Aspheric | −135.54 | 2.00 | GERMANIUM |
| 12 | Spherical | 56.54 | V2 | |
| 13 | Aspheric | 63.64 | 5.00 | ZNSE |
| 14 | Aspheric | −55.46 | V3 | |
| 15 | Aspheric | 12.80 | 2.30 | GERMANIUM |
| 16 | Diffractive | 11.19 | 7.00 | |
| 17 | Aspheric | 13.00 | 2.20 | GERMANIUM |
| 18 | Spherical | 15.05 | 3.30 | |
| 19 | Aspheric | −8.00 | 2.50 | GERMANIUM |
| 20 | Diffractive | −11.06 | 0.20 | |
| 21 | Spherical | −30.56 | 4.00 | SILICON |
| 22 | Spherical | −12.74 | 5.51 | | where V1, V2 and V3 are the distances between moving groups or between a moving group and a fixed one. These values will change when the moving groups change their positions along pre-defined routes, called CAM curves. Table 4 presents V1, V2 and V3 values in some FOV configurations.

TABLE 4

| Value (mm) | Wide FOV | Middle FOV | Narrow FOV |
|---|---|---|---|
| V1 | 11.50 | 48.79 | 53.00 |
| V2 | 66.598 | 16.84 | 6.00 |
| V3 | 9.50 | 23.42 | 37.56 |

In the present invention of a high magnification MWIR continuous zoom optical system, the authors made use of previous knowledge and experience in optical design, Gaussian optics analysis and Seidel forms of optical aberrations in order to build a standard design process that could be used to search for high quality on-axis starting points. Also in the present invention, the authors noticed and analyzed the intensity of the Narcissus effect right from the design stage of the optical system and also made use of different optimization techniques so that the intensity of this particular effect was reduced. A light and compact structure was also one of the important factors which the present invention achieved by using the extender—zoom—relay structure, with the extender group allowed the original system to achieve higher focal length value while also being detachable if not needed and the remaining components could work as an independent continuous zoom system. Meanwhile, the relay group helped optimizing the size of the optical elements and focus all infrared radiation onto the detector image plane with 100% cold stop efficiency. All elements within the optical system had reasonable sizes and were made from common infrared materials including Germanium, Zinc Selenide and Silicon which helped driving down the overall cost of the system as a whole. Also in the present invention, in order to achieve a magnification ratio of 20λ, the three moving groups must be moved simultaneously in order to change the focal length of the system while maintaining the focus property on the image plane at all time. Besides, another fourth moving group was also used in order to maintain optical quality in a wide range of temperature (from −20° C. to 60° C.) and a wide observation range (for objects from 10 m away from the camera up to 20 km). The proposed high magnification MWIR continuous zoom optical system is compatible with F/#4.0 detectors that has a focal plane array (FPA) of 640×512 pixels with 15 μm pixel pitch or a 320×240-pixel FPA with 30 μm pixel pitch.

Although the structure of the optical system in the present invention has been illustrated in the accompanying Drawings and described in the foregoing Detailed Description, it should be noted that the invention is not limited to the described optical system, but is capable of different rearrangements, modifications or substitutions without departing from the invention as set forth and defined by the following claims.

The invention claimed is:

1. A high magnification Mid-wave infrared (MWIR) continuous zoom optical system consisting of two parts with 6 main groups with the following arrangement from the object plane to the image plane, therein:
    a front part includes:
        an extender group (G1) which comprises 3 optical elements in a negative-positive-negative (N-P-N) power configuration, and that expands a diameter of the incoming radiation and a variable focal length range of the optical system;
    a rear part includes:
        a fixed group (G2) which comprises 2 optical elements, one of which is made from Silicon, has positive power and two spherical surfaces with a convex one heading towards an object plane while the other is made from Germanium, has negative power, a spherical surface and an aspheric surface;
        a first moving group (G3) which moves for zooming, and that comprises a single Germanium element having negative power, a concave aspheric surface and a concave spherical surface;
        a second moving group (G4) which moves for zooming, and that comprises a single Zinc Selenide element having positive power and two convex aspheric surfaces;
        a third moving group (G5) which moves for zooming, and that comprises a single Germanium element having positive power, an aspheric surface and a hybrid aspheric-diffractive surface;
        a relay group (G6) which comprises 3 optical elements in a positive-negative-positive (P-N-P) power configuration, and that is optimized in order to be movable within a small range of ±0.5 mm.

2. The high magnification MWIR continuous zoom optical system of claim 1, wherein the three optical elements which belong to the extender group also have these following properties:
    a first front element is made from Germanium, has negative power, a convex spherical surface and a concave aspheric surface, with a convex surface heading towards the object plane;
    a following second element is made from Silicon, has positive power and two spherical surfaces;
    a following third element is made from Silicon, has negative power and two spherical surfaces.

3. The high magnification MWIR continuous zoom optical system of claim 2, wherein the three optical elements which belong to the relay group also have these following properties:
    the first front element is made from Germanium, has positive power, a convex aspheric surface and a concave spherical surface;

the following second element is made from Germanium, has negative power, an aspheric surface and a hybrid aspheric-diffractive surface;

the following third element is made from Silicon, has positive power, a concave spherical surface and a convex spherical surface with the convex surface heading towards the image plane.

4. The high magnification MWIR continuous zoom optical system of claim 3, wherein the simultaneous changes in position of (G3), (G4) and (G5) leads to change of the system focal length, with some following limits:

the optical system achieves its minimum focal length value when (G3) and (G4) are at most distant positions from each other and (G5) is at a closest position to (G4);

the optical system achieves its maximum focal length value when (G3) and (G4) are at closest positions to each other and (G5) is at a most distant position from (G4).

5. The high magnification MWIR continuous zoom optical system of claim 3, wherein the relay group is responsible for magnifying an intermediate image and focusing that image onto a detector image plane, while its movement within a small range of ±0.5 mm helps maintaining the focus property of incoming radiation at different temperatures and object distances.

6. The high magnification MWIR continuous zoom optical system of claim 2, wherein the simultaneous changes in position of (G3), (G4) and (G5) leads to change of the system focal length, with some following limits:

the optical system achieves its minimum focal length value when (G3) and (G4) are at most distant positions from each other and (G5) is at a closest position to (G4);

the optical system achieves its maximum focal length value when (G3) and (G4) are at closest positions to each other and (G5) is at a most distant position from (G4).

7. The high magnification MWIR continuous zoom optical system of claim 6, wherein the relay group is responsible for magnifying an intermediate image and focusing that image onto a detector image plane, while its movement within a small range of ±0.5 mm helps maintaining the focus property of incoming radiation at different temperatures and object distances.

8. The high magnification MWIR continuous zoom optical system of claim 2, wherein the relay group is responsible for magnifying an intermediate image and focusing that image onto a detector image plane, while its movement within a small range of ±0.5 mm helps maintaining the focus property of incoming radiation at different temperatures and object distances.

9. The high magnification MWIR continuous zoom optical system of claim 1, wherein when the extender group is detached, the remaining part of the system still maintains good optical quality and operates as an independent high magnification middle wave infrared continuous zoom lens.

10. The high magnification MWIR continuous zoom optical system of claim 9, wherein the simultaneous changes in position of (G3), (G4) and (G5) leads to change of the system focal length, with some following limits:

the optical system achieves its minimum focal length value when (G3) and (G4) are at most distant positions from each other and (G5) is at a closest position to (G4);

the optical system achieves its maximum focal length value when (G3) and (G4) are at closest positions to each other and (G5) is at a most distant position from (G4).

11. The high magnification MWIR continuous zoom optical system of claim 10, wherein the relay group is responsible for magnifying an intermediate image and focusing that image onto a detector image plane, while its movement within a small range of ±0.5 mm helps maintaining the focus property of incoming radiation at different temperatures and object distances.

12. The high magnification MWIR continuous zoom optical system of claim 9, wherein the relay group is responsible for magnifying an intermediate image and focusing that image onto a detector image plane, while its movement within a small range of ±0.5 mm helps maintaining the focus property of incoming radiation at different temperatures and object distances.

13. The high magnification MWIR continuous zoom optical system of claim 1, wherein the three optical elements which belong to the relay group also have these following properties:

a first front element is made from Germanium, has positive power, a convex aspheric surface and a concave spherical surface;

a second following element is made from Germanium, has negative power, an aspheric surface and a hybrid aspheric-diffractive surface;

a third following element is made from Silicon, has positive power, a concave spherical surface and a convex spherical surface with a convex surface heading towards the image plane.

14. The high magnification MWIR continuous zoom optical system of claim 13, wherein the simultaneous changes in position of (G3), (G4) and (G5) leads to change of the system focal length, with some following limits:

the optical system achieves its minimum focal length value when (G3) and (G4) are at most distant positions from each other and (G5) is at a closest position to (G4);

the optical system achieves its maximum focal length value when (G3) and (G4) are at closest positions to each other and (G5) is at a most distant position from (G4).

15. The high magnification MWIR continuous zoom optical system of claim 14, wherein the relay group is responsible for magnifying an intermediate image and focusing that image onto a detector image plane, while its movement within a small range of ±0.5 mm helps maintaining the focus property of incoming radiation at different temperatures and object distances.

16. The high magnification MWIR continuous zoom optical system of claim 13, wherein the relay group is responsible for magnifying an intermediate image and focusing that image onto a detector image plane, while its movement within a small range of ±0.5 mm helps maintaining the focus property of incoming radiation at different temperatures and object distances.

17. The high magnification MWIR continuous zoom optical system of claim 1, wherein the simultaneous changes in position of (G3), (G4) and (G5) leads to change of the system focal length, with some following limits:

the optical system achieves its minimum focal length value when (G3) and (G4) are at most distant positions from each other and (G5) is at a closest position to (G4);

the optical system achieves its maximum focal length value when (G3) and (G4) are at closest positions to each other and (G5) is at a most distant position from (G4).

18. The high magnification MWIR continuous zoom optical system of claim 1, wherein the relay group is responsible for magnifying an intermediate image and focusing that image onto a detector image plane, while its movement within a small range of ±0.5 mm helps maintaining the focus property of incoming radiation at different temperatures and object distances.

\* \* \* \* \*